(12) United States Patent
McBrien et al.

(10) Patent No.: US 6,580,840 B1
(45) Date of Patent: Jun. 17, 2003

(54) HIGH EFFICIENCY ELECTRO-OPTIC MODULATOR WITH EQUALIZED FREQUENCY RESPONSE

(75) Inventors: Gregory J McBrien, Cromwell, CT (US); Karl M. Kissa, Simsbury, CT (US); Timothy U. Horton, Weatogue, CT (US)

(73) Assignee: JDS Uniphase Corporation, Ottawa (CA)

( * ) Notice: Subject to any disclaimer, the term of this patent is extended or adjusted under 35 U.S.C. 154(b) by 398 days.

(21) Appl. No.: 09/668,401

(22) Filed: Sep. 22, 2000

Related U.S. Application Data

(63) Continuation-in-part of application No. 09/309,444, filed on May 11, 1999, now Pat. No. 6,483,953.

(51) Int. Cl.$^7$ ............................ G02F 1/035; G02B 6/10
(52) U.S. Cl. ................................................. 385/2; 385/3
(58) Field of Search ........................ 385/1–3; 359/153, 359/161, 245, 248, 254, 276

(56) References Cited

U.S. PATENT DOCUMENTS

| | | | | |
|---|---|---|---|---|
| 4,448,479 | A | 5/1984 | Alferness | 350/96.14 |
| 4,468,086 | A | 8/1984 | Liu | 350/96.14 |
| 4,553,810 | A | 11/1985 | Alferness et al. | 350/96.14 |
| 4,843,350 | A | 6/1989 | Nazarathy et al. | 332/7.51 |
| 5,138,480 | A | 8/1992 | Dolfi et al. | 359/251 |
| 5,291,565 | A | 3/1994 | Schaffner et al. | 385/3 |
| 5,680,497 | A | 10/1997 | Seino et al. | 385/129 |
| 6,483,953 | B1 * | 11/2002 | McBrien et al. | 385/2 |

FOREIGN PATENT DOCUMENTS

| | | | | |
|---|---|---|---|---|
| EP | 0 340 043 | | 11/1989 | G02F/1/03 |
| EP | 0 629 892 A2 | | 12/1994 | G02F/1/035 |
| GB | 2138587 A | | 10/1984 | G02F/1/03 |

OTHER PUBLICATIONS

F. Rahmatian et al., "An Ultrahigh–Speed AlGaAs–GaAs Polarization Converter Using Slow–Wave Coplanar Electrodes" *IEEE Photonics Tech. Letters* 10(5):675–677 (1998).

J.H. Schaffner et al., "Velocity–Matching in Millimeter Wave Integrated Optic Modulators with Periodic Electrodes" *J. Lightwave Tech.* 12(3):503–511 (1994).

F.T. Sheehy et al., "60 GHz and 94 GHz Antenna–Coupled LiNbO$_3$ Electrooptic Modulators" *IEEE Photonics Technology Letters* 5(3):307–310 (1993).

C.D. Watson et al., "Proposal for A 94–GHz Phase–Reversal Optical Modulator Using A Loaded Transmission Line" *IEEE Photonics Techn. Letters* 9(1):52–54 (1997).

R.C. Alferness et al., "Velocit y–Matching Techniquees for Integrated Optic Traveling Wave Switch/Modulators" *IEEE Journal of Quantum Electronics* QE–20(3):301–309 (1984).

International Search Report dated Dec. 04, 2000 in corresponding PCT Application No. PCT/US00/12397.

* cited by examiner

*Primary Examiner*—Frank G. Font
*Assistant Examiner*—Michael P. Mooney
(74) *Attorney, Agent, or Firm*—Kurt Rauschenbach; Rauschenbach Patent Law Group, LLC

(57) ABSTRACT

A high-efficiency electro-optic modulator with an equalized frequency response is described. The modulator includes an optical waveguide formed in an electro-optic material that propagates an optical signal along a first direction of propagation. An electrical waveguide is formed on the electro-optic material and positioned generally co-linear relative to the optical waveguide and in electromagnetic communication with the optical waveguide. The geometry of the electrical waveguide is selected to achieve a modulation efficiency at a frequency in a bandwidth of a digital spectrum. A compensation network is electrically coupled to the electrical waveguide at a junction. The compensation network reduces an electro-optic response of the electro-optic modulator below the mean frequency bandwidth of the digital spectrum, thereby causing an increase of the electro-optic response above the mean frequency of the digital spectrum.

38 Claims, 13 Drawing Sheets

HIGH EFFICIENCY ELECTRO-OPTIC MODULATOR WITH EQUALIZED FREQUENCY RESPONSE

RELATED APPLICATIONS

This is a continuation-in-part of patent application of Ser. No. 09/309,444, now U.S. Pat. No. 6,483,953, filed on May 11, 1999, the entire disclosure of which is incorporated herein by reference.

FIELD OF THE INVENTION

The invention relates generally to the field of optical modulation. In particular, the invention relates to methods and apparatus for high-efficiency electro-optic modulation.

BACKGROUND OF THE INVENTION

Optical modulators impress or modulate RF (or microwave) electrical signals onto a light beam in order to generate a modulated optical beam that carries data. Modulators either directly modulate the optical beam as it is generated at the optical source or externally modulate the optical beam after it has been generated. Direct modulation may be accomplished by modulating the drive current of the optical source. Direct modulation may also be accomplished by modulating the optical intensity of light leaving the source with an integrated electro-absorptive modulator.

External modulation can be accomplished by using an external modulator that is separate from the optical source. External modulation is advantageous because it can modulate signals over a very wide bandwidth. External modulators are typically voltage-controlled devices that include a traveling-wave electrode structure, which is positioned in close proximity to the optical waveguide. The electrode structure produces an electric field that overlaps the optical waveguide over a predetermined distance (the interaction length) and causes an electromagnetic interaction, which modulates the optical signal.

Lithium niobate (LN) electro-optic external modulators are increasingly being used to modulate data on optical signals that are being transmitted at very high data rates and over long distances. Lithium niobate modulators are advantageous because they can modulate optical signal over a broad frequency range, they modulate optical signals with controlled, potentially zero, optical frequency shift (frequency "chirp"), and they operate over a broad wavelength range. These features are particularly desirable for Dense Wavelength Division Multiplexing (DWDM) broadband optical communication systems that transmit optical signals with many optical wavelengths through a single optical fiber.

Lithium niobate crystals have an inherent mismatch between the velocity of optical and electrical signals propagating through the crystal, which lowers modulation efficiency. The RF propagation index is significantly higher than the optical refractive index of lithium niobate. That is, the lithium niobate crystal slows the RF signal relative to the optical signal so that it takes the RF signal a longer period of time to travel over the interaction distance. Thus, the RF signal becomes out-of-phase with or "walks off" the accumulated modulation on the optical signal.

This "walk off" lowers the modulation efficiency. Modulators used for transmission at high speeds and over long distances must be efficient to minimize the use of electronic amplifiers and digital drivers. Electronic amplifiers and digital drivers are costly and occupy valuable space in the transmission link. In addition, electronic amplifiers and digital drivers may fail and lower the quality of service and require expensive maintenance in the field.

FIG. 1 illustrates a top view of a prior art electro-optic device 10 that increases modulation efficiency by compensating for the velocity mismatch between the optical and electrical signals propagating through the device by using phase reversal sections that are co-linear with the optical waveguide. The device 10 includes an optical waveguide 12 and RF electrodes 14 that are positioned in zero degree phase sections 16 and phase reversal sections 18.

The phase reversal sections 18 periodically flip the RF electrodes 14 to either side of the optical waveguide 12 to produce a 180 degree phase shift in the RF signal relative to the accumulated modulation on the optical signal. The RF electrodes 14 are positioned to alternate between the zero degree phase sections 16 and the phase reversal sections 18. The length of the zero degree phase shift sections 16 is chosen so that the RF signal "walks off" the accumulated modulation on the optical signal approximately 180 degrees before it is flipped 180 degrees in the phase reversal sections 18.

The prior art electro-optic device 10 of FIG. 1 has relatively low modulation efficiency per unit length. This is because the phase of the RF signal is modified with co-linear sections that are positioned at intervals of 180 degrees. When the difference in phase between the RF and optical signals approaches 180 degrees, the incremental increase in modulation depth with incremental change in electrode length approaches zero. Therefore, the total length of the device must be significantly increased in order to achieve the required modulation.

FIG. 2 illustrates a top view of a prior art electro-optic device 30 that increases modulation efficiency by compensating for the velocity mismatch between the optical and electrical signals propagating through the device 30 by using co-linear but intermittent interaction sections. The device 30 includes an optical waveguide 32 and RF electrodes 34 that are positioned to alternate between an interaction region 36 and a non-interaction region 38 relative to the optical waveguide 32.

The length of the interaction region 36 is chosen so that the RF signal "walks off" the modulation on the optical signal by as much as 180 degrees of phase shift before it is routed away from the optical waveguide 32 in a co-linear direction and into the non-interaction region 38. The length of the non-interaction region 38 is chosen so that the RF signal becomes phase matched with the accumulated modulation on the optical signal at the end of the non-interaction region 38. The prior art modulator of FIG. 2 has non-interaction regions of substantial length that re-align the phase of the modulating signal, but introduce RF loss, and occupy device length.

Increasing the length of a lithium niobate electro-optic modulator increases the size of the package. Increasing the size of the modulator package and the power supplies is highly undesirable because the space on transmitter boards and in transmission huts is very limited. Efficiency is also a major consideration, as more powerful electronic drivers require more space on the transmitter card. State-of-the-art DWDM transmission equipment occupies a significant amount of space because the equipment includes electronics for numerous channels. Most transmission huts were designed for much more modest communication systems and are not very spacious. Many transmission huts cannot be expanded for various reasons.

Another disadvantage of prior art electro-optic modulators in FIGS. 1 and 2 is that these modulators are not suitable for modulating digital signals. This is because these modulators have non-linear phase characteristics as a function of frequency response. Therefore, the digital pulse shapes are not preserved. In addition, the efficiency is concentrated in a set of narrow band regions, which is suitable for a square wave signal, but is unsuitable for digital signals having an arbitrary bit sequence. Other prior art modulators correct the uniformity of efficiency with frequency by using a periodic, Barker-code, phase reversal locations along the modulator length. However, these prior art modulators still have non-linear phase as a function of frequency.

Some prior-art electro-optic modulators uses a buffer layer to achieve velocity matching as described in connection with FIG. 3. These prior art devices have non-optimized modulation efficiency because they preserve significant modulation beyond the required bandwidth.

Some prior art electro-optic modulators use z-cut lithium niobate. Using z-cut lithium niobate is advantageous because z-cut lithium niobate inherently provides better overlap between optical and RF fields and thus, has an inherently high modulation efficiency as compared with x-cut lithium niobate electro-optic modulators. Z-cut lithium niobate electro-optic modulators, however, experience bias drift effects. Conductive buffer layers and charge bleed-off layers are typically used to mitigate these bias drift effects. Including a conductive buffer layer and charge bleed-off layer adds significantly to the fabrication cost associated with z-cut electro-optic modulators. In addition, prior art z-cut lithium niobate electro-optic modulator preserve significant modulation beyond the required bandwidth and, therefore do not have optimized efficiency.

SUMMARY OF THE INVENTION

The present invention relates to high-efficiency electro-optic modulation and to electro-optic modulators for modulating digital signals with equalized frequency response. A discovery of the present invention is that modulation efficiency of electro-optic modulators can be increased by discarding excess modulation efficiency in regions inside and outside the bandwidth of the digital spectrum. Another discovery of the present invention is that the modulation efficiency and the frequency response of an electro-optic modulator can be independently optimized by first choosing an electrode geometry that corresponds to a modulation efficiency in the digital signal spectrum. Compensation networks are then added at various points along the length of the modulating electrode in order to modify the frequency response of the modulator to discard excess modulation efficiency where it is not needed, and add efficiency where it is needed. Optimum modulation efficiency and frequency response are achieved by iterating the selection of the electrode geometry and position and type of compensation network.

Accordingly, the present invention features an electro-optic modulator for modulating a digital signal, such as a Mach Zehnder interferometric modulator, comprising an optical waveguide formed in an electro-optic material that propagates an optical signal along a first direction of propagation. A buffer layer may be formed on the optical waveguide to at least partially velocity match the electrical modulation signal to an optical signal.

An electrical waveguide is formed on the electro-optic material and positioned generally co-linear relative to the optical waveguide and in electromagnetic communication with the optical waveguide. The electrical waveguide propagates an electrical modulation signal in the first direction of propagation. The electrical waveguide may provide chirp modulation.

The electrical waveguide includes hot and ground electrical waveguides positioned proximate to the arms of the Mach Zehnder interferometric modulator. In one embodiment, the electrical waveguide comprises a co-planner strip electrode. A driver is coupled to the electrical waveguide. In one embodiment, the driver has a frequency response that is complementary to an electro-optic frequency response of the modulator.

The geometry of the electrical waveguide is selected to achieve a modulation efficiency at a frequency in a bandwidth of a digital spectrum. At least one of the buffer layer thickness, buffer layer dielectric constant, and electrode geometry are selected to achieve a modulation efficiency or to maximize the modulation efficiency at the frequency in the bandwidth of the digital spectrum. In one embodiment, the electrical waveguide geometry is selected to achieve the modulation efficiency at substantially a mean frequency in the bandwidth the digital spectrum.

In one embodiment, the electrical waveguides comprise dual-drive electrical waveguides including a first and second pair of hot and ground electrical waveguides positioned proximate to a first and second arm of the Mach Zehnder interferometric modulator, respectively. A driver is coupled to each pair of hot and ground electrical waveguides. In one embodiment, a frequency response of each driver is complementary to the electro-optic frequency response of the modulator.

A compensation network is electrically coupled to the electrical waveguide at a junction. The compensation network may comprise a plurality of compensation networks where a respective one of the plurality of compensation networks is electrically coupled to the electrical waveguide at a respective one of a plurality of junctions. The compensation network modifies the electro-optic response of the electro-optic modulator below a mean frequency of the digital spectrum, thereby causing a magnitude of the electro-optic response to increase in the bandwidth of the digital spectrum. The compensation network modifies at least one of a phase or an amplitude of the electrical modulation signal at the junction relative to a phase or an amplitude of the optical signal at the junction, respectively.

There are numerous embodiments of the compensation network. The compensation network may include an RF time delay network or a polarity reversal section. In one embodiment, the compensation network propagates the electrical signal in a second direction of propagation that is substantially non-co-linear with the first direction of propagation. The electrical loss per unit length of the compensation network may be lower than an electrical loss per unit length of the electrical waveguide. The compensation network may be removably attached to the electro-optic modulator. Also, the temperature dependence of the compensation network may be inversely proportional to a temperature dependence of the electro-optic material.

The present invention also features a method of independently controlling modulation efficiency and electro-optic response of an electro-optic modulator for modulating a digital signal. The method includes selecting a modulator length corresponding to a modulator bandwidth. The modulation efficiency is then adjusted at a frequency in the bandwidth of a digital spectrum by selecting an electrical waveguide geometry of the electro-optic modulator.

The magnitude of the electro-optic response is then reduced below a mean frequency of the digital spectrum. In one embodiment, the magnitude of the electro-optic response is reduced electro-optically. In some embodiments, the electro-optic response above the mean frequency of the digital spectrum is increased. The steps of choosing the modulator length, adjusting the modulation efficiency, and reducing the magnitude of the electro-optic response below the mean frequency of the digital spectrum may by iterated to achieve a predetermined modulation efficiency and electro-optic response in the bandwidth of the digital spectrum.

The present invention also features a method of independently optimizing the modulation efficiency and electro-optic response of an electro-optic modulator for modulating a digital signal. The method includes selecting a modulator length that corresponds to a modulator bandwidth. The modulation efficiency is then optimized at a frequency in the bandwidth of a digital spectrum by selecting an electrical waveguide geometry of the electro-optic modulator.

The electro-optic response is optimized above the mean frequency of the digital spectrum by reducing a magnitude of an electro-optic response below the mean frequency of the digital spectrum. The steps of selecting the modulator length, optimizing the modulation efficiency, and optimizing electro-optic response above the mean frequency of the digital spectrum may by iterated to achieve a predetermined modulation efficiency and electro-optic response in the bandwidth of the digital spectrum.

BRIEF DESCRIPTION OF THE DRAWINGS

This invention is described with particularity in the appended claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
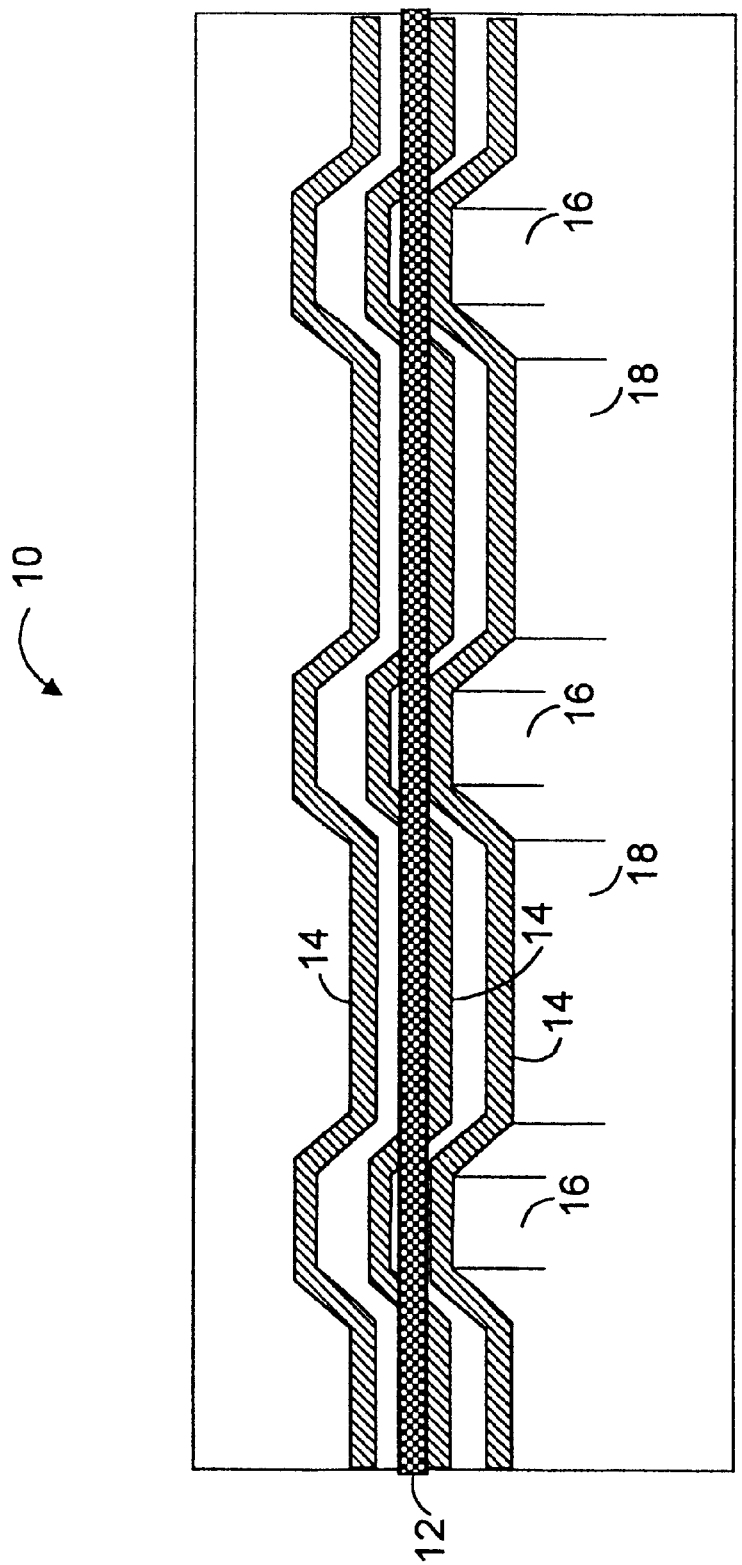
FIG. 1 illustrates a top view of a prior art electro-optic device that increases modulation efficiency by compensating for the velocity mismatch between the optical and electrical signals propagating through the device by using phase reversal sections that are co-linear with the optical waveguide.
Figure 2:
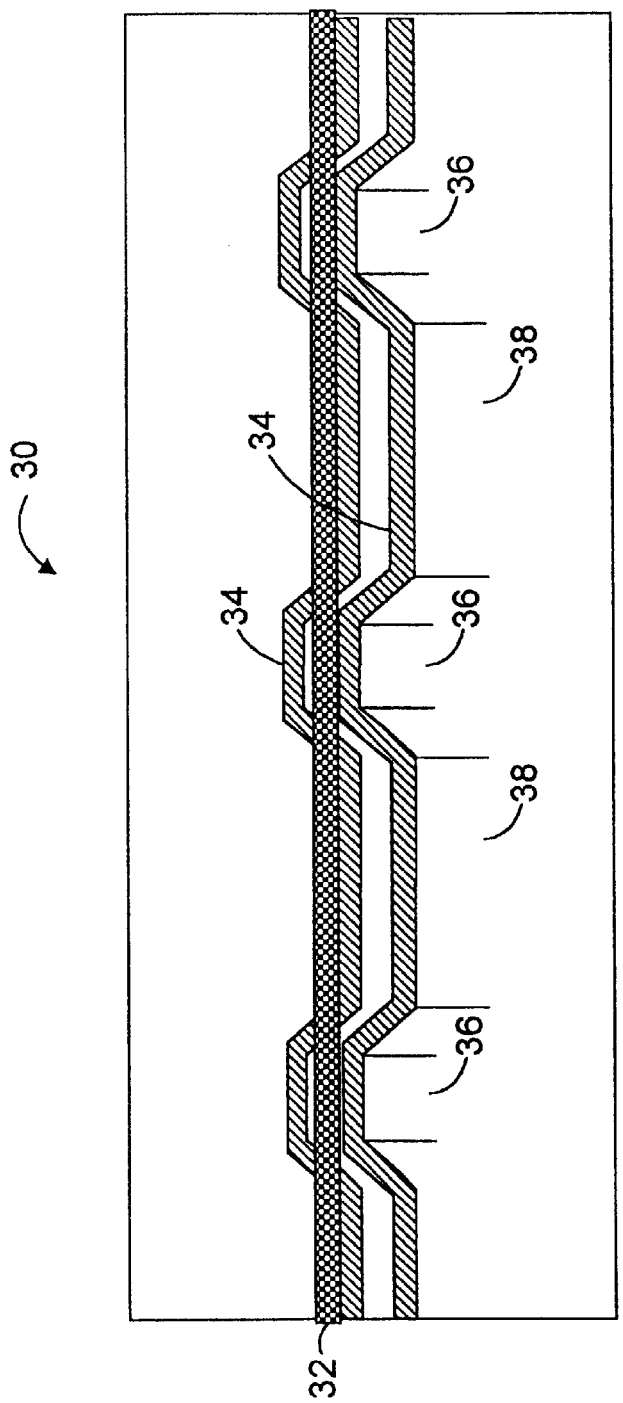
FIG. 2 illustrates a top view of a prior art electro-optic device that increases modulation efficiency by compensating for the velocity mismatch between the optical and electrical signals propagating through the device by using co-linear but intermittent interaction sections.
Figure 3:
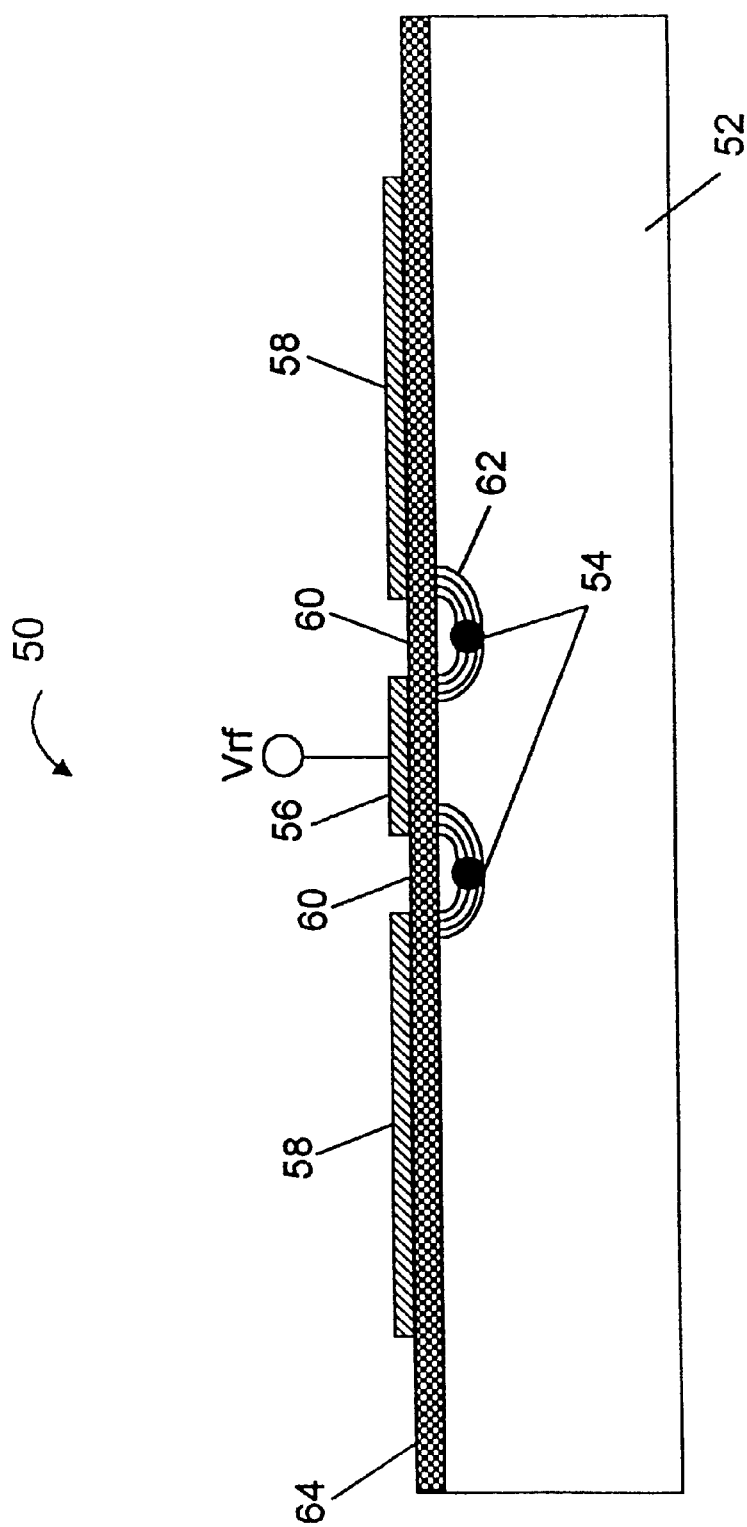
FIG. 3 illustrates an electrode cross-section of a prior art traveling wave electro-optical modulator where the optical and electrical signals propagate in an entirely co-linear path.

FIG. 3 illustrates an electrode cross-section of a prior art traveling wave electro-optical modulator 50 where the optical and electrical signals propagate in an entirely co-linear path. The substrate 52 is formed of an electro-optic material, such as lithium niobate ($LiNbO_3$). Many prior art modulators use X-cut $LiNbO_3$ substrates. The modulator includes optical waveguides 54 that are positioned entirely within the substrate 52. The optical waveguides 54 may be formed by diffusing titanium into the $LiNbO_3$ substrate 52. Electrical waveguides are positioned in a co-planar waveguide (CPW) geometry with a hot electrode 56 positioned in the center of the CPW structure and ground electrodes 58 positioned adjacent to both sides of the hot electrode 56. The ground electrodes 58 are spaced apart from the hot electrode by a gap 60. Typical prior art modulator lengths are on order of 20 to 50 mm.

Optical and electrical modulation signals propagate along the optical 54 and electrical waveguides 56, 58, respectively, into the plane of the page. The electrical modulation signal generates an electric field 62 that travels from the hot electrode 56 to the ground electrodes 58. It is desirable to minimize the required amplitude of the electrical modulation signal. The gap 60 is typically chosen to be small in order to maximize the electromagnetic interaction of the electrical waveguides 56, 58 with the optical waveguides 54 and thus minimize the amplitude of the required electrical modulation signal.

The required amplitude of the electrical modulation signal is determined by the switching voltage-length product (Vpi-L) of the modulator, which is a function of both the electrode geometry and the degree of overlap between the electric field 62 and the optical signal. Vpi-L of typically prior art modulators is typically 40 to 50 Volt-mm for the CPW structure shown in FIG. 3. Thus for a modulator with 20 mm long electrodes, the required electrical modulation signal is approximately 2 volts.

A disadvantage of the prior art modulator 50 is that at high modulation frequencies, RF losses become significant. Typical RF losses range from about 0.5 to 1 dB/Sqrt(GHz)-cm for $LiNbO_3$. Consequently, the electromagnetic interaction of the electrical waveguides 56, 58 with the optical waveguides 54 decreases at high frequency thereby increasing the Vpi-L and thus, the required amplitude of the electrical modulation signal.

Another disadvantage of prior art modulators is that the velocities of the optical signal and the electrical modulation signal are different. The velocity of the electrical modulation signal is determined by the RF propagation index, which may be as high as 3.5 to 4.0. The velocity of the optical signal is determined by the optical propagation index, which is approximately 2.1 for LiNbO$_3$. The difference in the RF index and the optical propagation index results in a significant velocity mismatch of the optical and the electrical modulation signals. This velocity mismatch results in the modulation on the optical signal becoming out-of-phase with the electrical modulation signal, thereby reducing or canceling the accumulated modulation, and increasing the amplitude of the required electrical modulation signal and lower the modulation efficiency.

Some prior art modulators include a buffer layer 64 that is positioned between the electrodes 56, 58 and the substrate 52 that has a lower dielectric constant than the substrate 52. Using the buffer layer 64 lowers the RF index because the buffer layer 64 together with the substrate 52 presents an average effective RF index that is somewhere between the RF refractive index of the buffer layer 64 and the RF index of the substrate. Using a buffer layer, however, degrades the efficiency of the modulator because the electric field must penetrate a longer path and thus is reduced in magnitude.

Modulator efficiency and frequency response are strongly coupled parameters in these prior-art lithium niobate broadband modulators. The frequency response of these modulators typically drops off in an approximate linear function with increasing frequency. Adding incremental efficiency at high frequencies, near the mean of a digital signal spectrum, typically also adds efficiency at lower frequencies, but at an even faster rate than near the mean of the digital signal spectrum. Consequently, optimizing the electrode structure for maximum efficiency at the mean of the digital signal spectrum usually results in excessive efficiency at low frequencies, and therefore excessive roll-off in modulation response with frequency. Thus, even though these prior art modulator are more efficient at high frequencies, they will have slow rise and fall times in response to a digital signal because of an inadequate 3 dB bandwidth.

Electro-optic modulators of the present invention use compensation networks to electro-optically discard electro-optic efficiency inside or outside of the bandwidth of the digital spectrum. In one embodiment, compensation networks are used to create a frequency response that is substantially flat up to some desired corner frequency, which is near the bandwidth of the modulator. The frequency response then drops off rapidly above the corner frequency. Therefore, the modulation response at very high frequencies is discarded. This is desirable because modulation components at very high frequencies can be corrupted by fiber dispersion in a communication link and they provide no system performance benefit.

Figure 4:
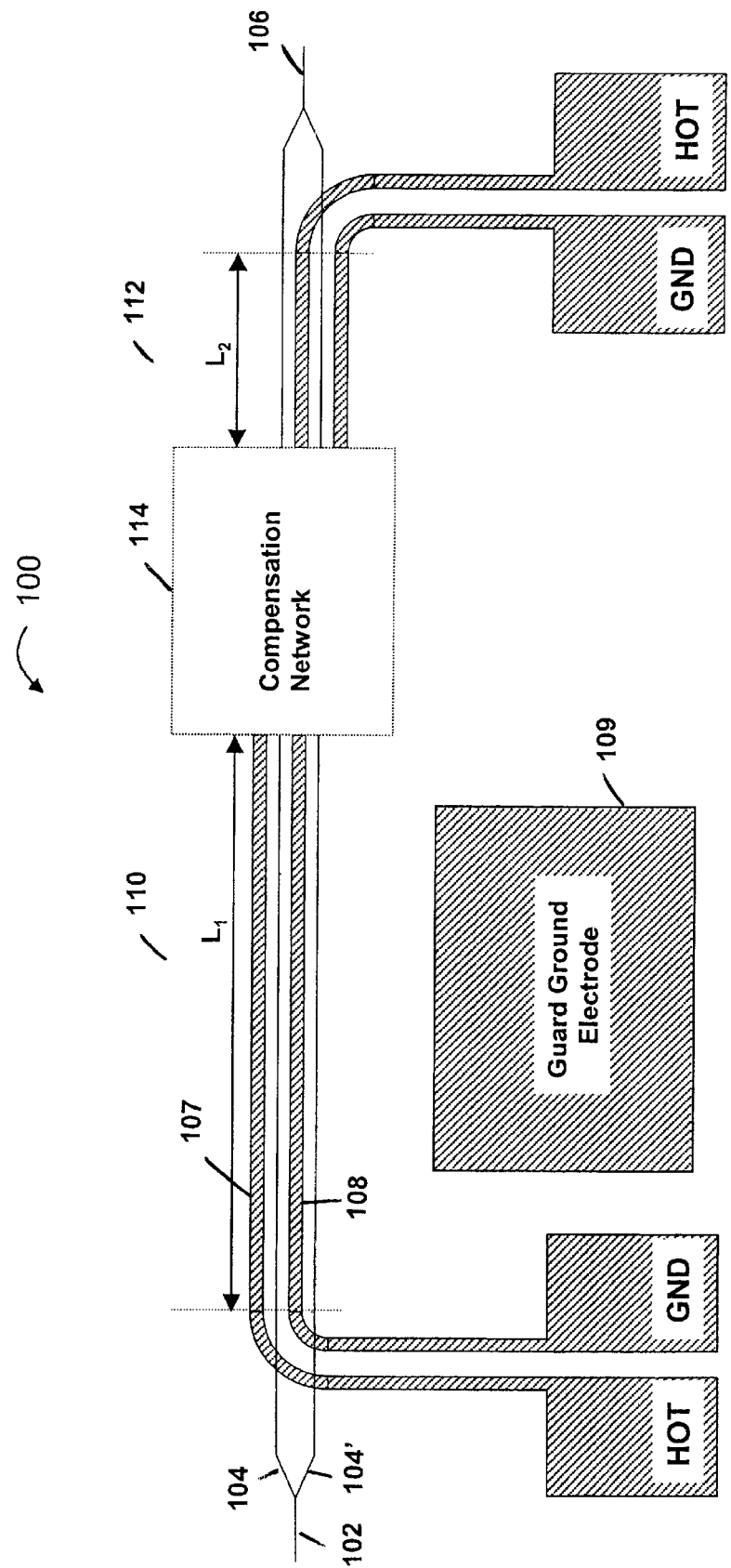
FIG. 4 illustrates a top view of an equalized Mach-Zehnder x-cut single-drive electro-optic modulator according to the present invention.

FIG. 4 illustrates a top view of an equalized Mach-Zehnder x-cut single-drive electro-optic modulator 100 according to the present invention. The modulator 100 includes an optical input 102, a first 104 and second optical waveguide 104' forming two arms of a Mach-Zehnder interferometer, and an optical output 106. The optical waveguides 104, 104' are formed in an x-cut lithium niobate substrate as described in connection with FIG. 3 or by numerous other techniques known in the art.

A hot electrical waveguide 107 and a ground electrical waveguide 108 are positioned in a co-planar strip electrode geometry along one arm of the interferometer. A guard ground electrode 109 may be positioned adjacent to the optical waveguides 104, 104' to achieve thermal balancing. The electrical waveguides 107, 108 propagate electrical modulation signals proximate to the optical waveguides 104, 104'. In one embodiment, the electrical modulation signals are partially velocity matched to the optical signals. In this embodiment, a thin buffer layer is used to achieve partial velocity matching. In one embodiment, the electrodes provide chirped modulation, which is useful for some applications.

Numerous other waveguide geometries can be used. Coplanar strip electrodes are advantageous because they reduce bias point drift compared to prior art asymmetric coplanar waveguides. In addition, coplanar strip electrodes are advantageous because it is relatively easy to construct RF delay lines and polarity reversal sections using coplanar strip electrodes. Also, it is relatively easy to mate the modulator to a various output drivers including complementary output drivers because the electrode structure does not have to be modified.

The modulator 100 includes a main modulation section 110 and an equalization section 112. A compensation network 114 is electrically coupled between the main modulation section 110 and the equalization section 112. The compensation network 114 may be integrated into the hot electrical waveguide 107 and the ground electrical waveguide 108 or may be a separate device that is electrically connected, but removably attached to the modulator 100. A removably attached compensation network is advantageous because it can be easily reconfigured.

The compensation network 114 is used to equalize the electro-optic response. By electro-optic response, we mean the ratio of the magnitude and phase of an RF output voltage generated by a photodetector that detects the modulated optical signal propagating from the optical output 106 to the magnitude and phase of the RF modulation signal. The electro-optic response represents the accumulated modulation on the optical signal for either section of the modulator, or the entire modulator.

The compensation network 114 modifies at least one of the phase or the amplitude of the electrical signal relative to the phase or amplitude of the accumulated modulation on the optical signal. In one embodiment, the compensation network 114 is designed to achieve a substantially flat electro-optic response in phase and magnitude from DC to a cut-off frequency. Above the cut-off frequency, the electro-optic response attenuates rapidly.

One advantage of the present invention is that the compensation is performed electro-optically rather than purely electrically. Electro-optic compensation is physically more compact than prior art electrical compensation methods because the compensation structure is integrated in the device. Electro-optic compensation is also more efficient than prior art electrical compensation because the electro-optic compensation of the present invention has much less electrical insertion loss. The insertion loss is less because the compensation networks are physically integrated into the device and, therefore, RF coupling losses are minimal because the modulator and the compensation network have similar electrode structures. Also, the insertion loss is less because the compensation networks of the present invention are typically located downstream of the RF input and, therefore, the RF performs some modulation before the compensation network.

In one embodiment, the compensation network 114 temporarily directs the electrical signal in a path that is in a non-co-linear direction relative to the direction of propagation of the optical signal. The compensation network may comprise an RF delay line and polarity reversal as described in connection with FIG. 5 that modifies the frequency response. The compensation network may also comprise an RF delay line and a polarity reversal section as described in connection with FIG. 6 that modifies the frequency response. For example, the frequency response of the compensation network 114 may be modified so that it is substantially flat to a corner frequency and then rapidly attenuates at frequencies above the corner frequency.

In one embodiment of the present invention, the compensation network 114 is designed to generate frequency response characteristics that vary with at least one external perturbation in a manor that compensates for such perturbation. For example, the compensation network 114 may be designed to generate frequency response characteristics that vary with temperature in such a way as to compensate for the effect of temperature variations in the electro-optic substrate. This can be accomplished by varying the physical length, dielectric constant, or other parameters of the compensation network. In one embodiment, a plurality of compensation networks 114 is positioned periodically along the modulator 100. In other embodiments, a plurality of compensation networks 114 is positioned non-periodically along the modulator. There are numerous advantages to the compensation network of the present invention. One advantage is that such a compensation network can modify the phase of the electrical signal relative to the optical signal in order to minimize the effects of velocity mismatch, while introducing very low loss. The compensation network 114 can be designed so that the electrical loss per unit length is significantly lower than the electrical loss per unit length of the electrical waveguide. For example, the electrodes comprising the compensation network 114 can be constructed with wider conductors that have relatively low resistive losses and wider gaps between the conductors, which reduce skin effect losses.

Figure 5:
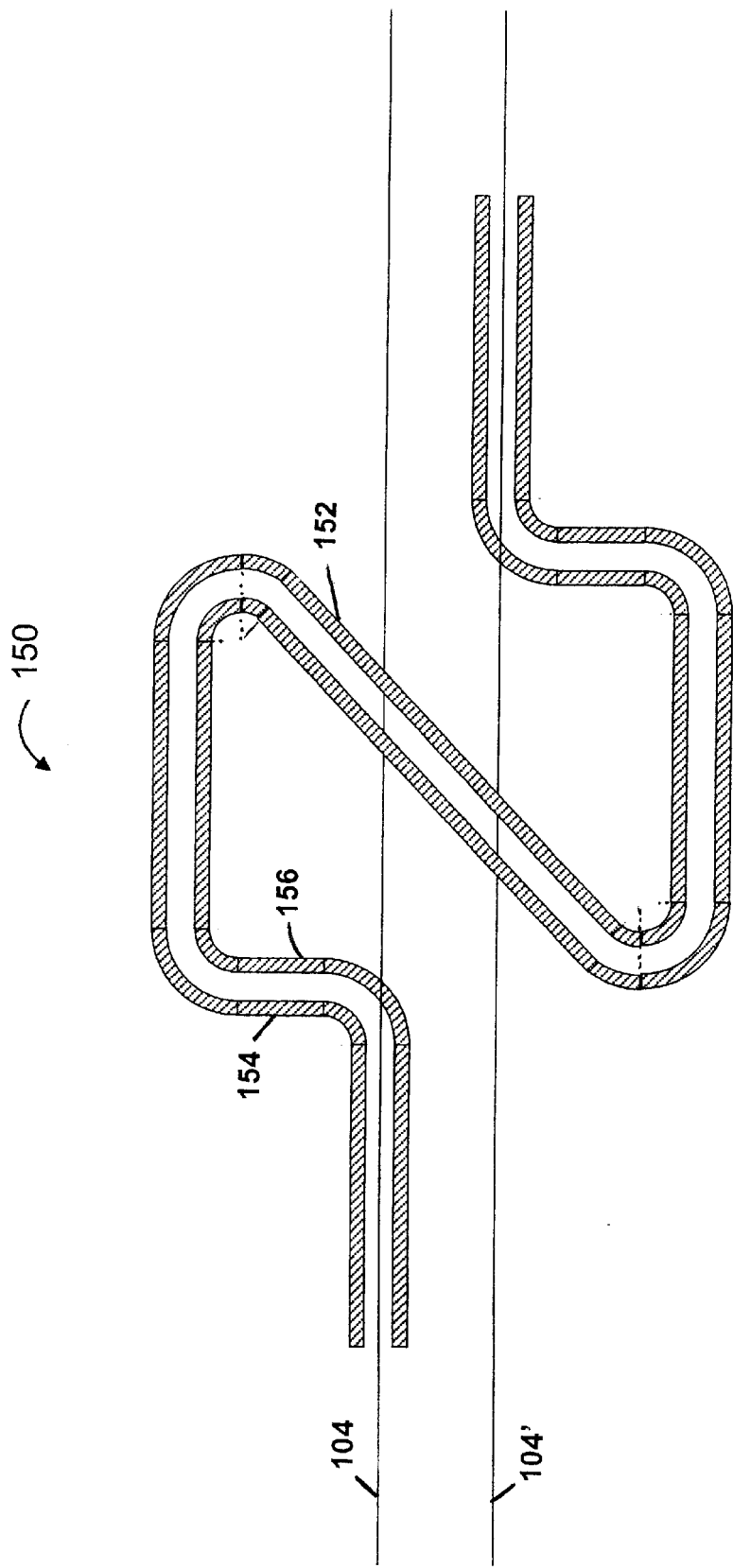
FIG. 5 illustrates a top view of one embodiment of a compensation network for the equalized Mach-Zehnder x-cut electro-optic modulator of FIG. 4 that includes an RF delay line, and polarity reversal due to the lateral electrode shift.

FIG. 5 illustrates a top view of one embodiment of a compensation network 150 for the equalized Mach-Zehnder x-cut electro-optic modulator of FIG. 4 that includes an RF delay line 152, and polarity reversal due to the lateral electrode shift. The compensation network 150 comprises a hot electrical waveguide 154 and ground electrical waveguide 156 that temporarily directs the electrical signal to the RF delay line section 152 that is in a non-co-linear direction relative to the direction of propagation of the optical signal. The RF delay line section 152 has a length that causes a predetermined RF delay relative to the accumulated modulation that is variable over a range from zero to one hundred and eighty degrees. In one embodiment, this predetermined delay is substantially one hundred and ten degrees.

The compensation network 150 modifies at least one of the phase and the amplitude of the electrical signal relative to the phase and amplitude of the accumulated modulation on the optical signal. In one embodiment, compensation network 150 modifies only the phase and the amplitude is substantially unchanged. Fringing fields from the hot electrical waveguide 154 and ground electrical waveguide 156 cause some modulation of the adjacent waveguide, which changes polarity after the compensation network. In one embodiment, the frequency response of the compensation network 150 is substantially flat to a corner frequency and then rapidly attenuates at frequencies above the corner frequency.

In another embodiment, the frequency response of the compensation network 150 is substantially flat with no corner frequency up to the frequency where the response drops off because of velocity walk-off. In this embodiment, the compensation network aligns the phases of the RF and accumulated modulation over a narrow band of frequencies near the high end of the operating band, thereby causing some peaking of frequency response. The peaking in the frequency response near the high end compensates for the natural roll-off of the modulator and, therefore, produces a flatter frequency response in the bandwidth of the digital spectrum. The compensation network may include a polarity reversal section as described in connection with FIG. 5, FIG. 6 and FIG. 10 that causes a reduction in the frequency response at the low end of the operating band.

The equalized Mach-Zehnder electro-optic modulator 100 of FIG. 4 using the compensation network 150 of FIG. 5 operates in the following way. An optical signal is coupled to the optical signal input 102 of the modulator 100. An electrical modulation signal is coupled to the hot electrical waveguide 107 and the ground electrical waveguide 108. The optical signal propagates along the optical waveguides 104, 104' in the main section of the modulator 100. The electrical modulation signal propagates along the hot electrical waveguide 107 and the ground electrical waveguide 108 until it enters the compensation network 150.

When the electrical modulation signal enters the RF delay line section 152, the electrical modulation signal does not significantly electromagnetically interact with the optical signal. The RF delay line section 152 modifies the phase of the electrical modulation signal relative to the phase of the accumulated modulation on the optical signal, and then returns the compensated modulation signal to the equalization section 112 of the modulator 100.

Figure 6:
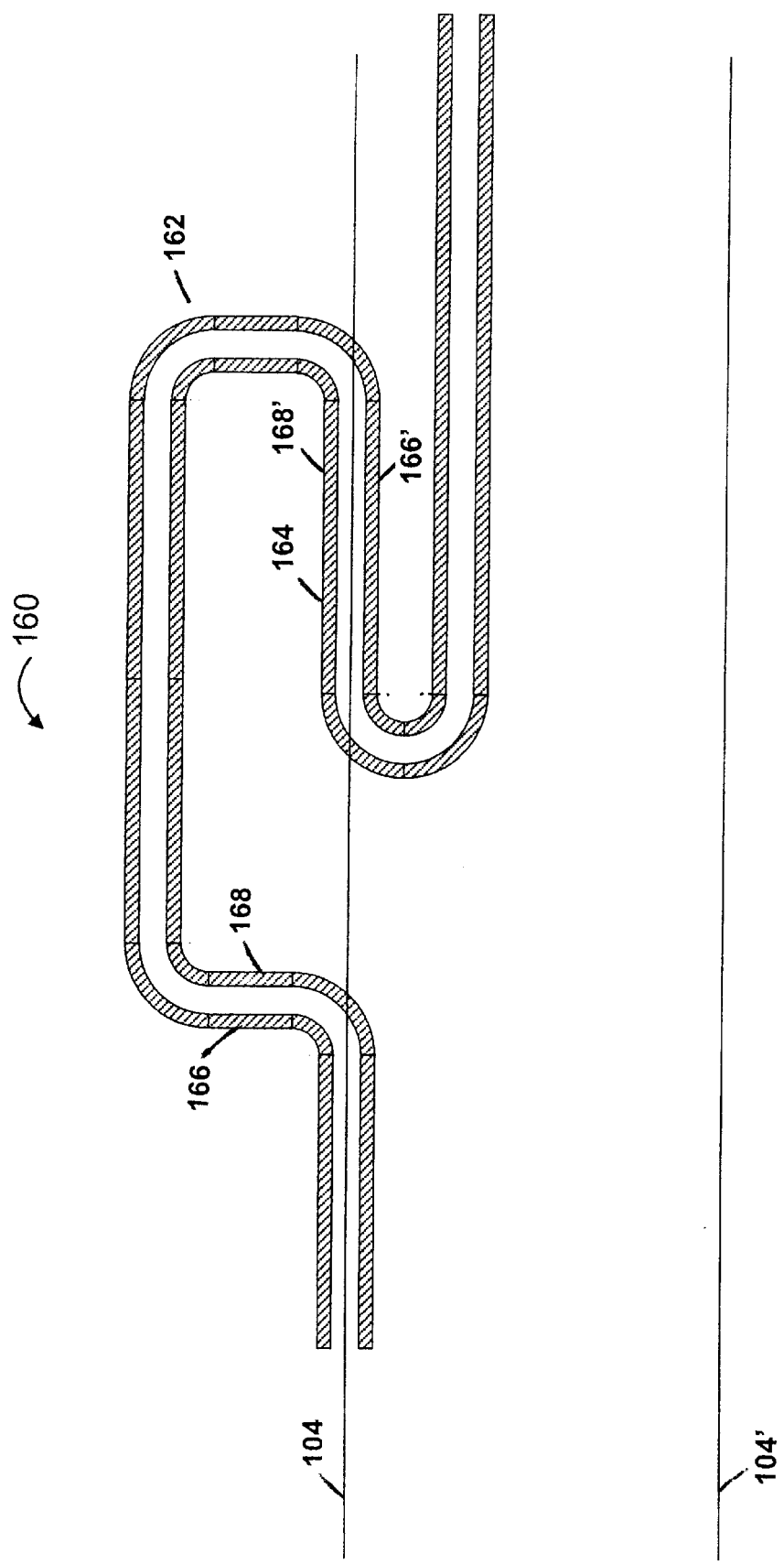
FIG. 6 illustrates a top view of one embodiment of a compensation network and equalization section for the equalized Mach-Zehnder x-cut electro-optic modulator of FIG. 4 that includes an RF delay line and a polarity reversed equalization section.

FIG. 6 illustrates a top view of one embodiment of a compensation network and polarity-reversed equalization section 160 for the equalized Mach-Zehnder x-cut electro-optic modulator of FIG. 4 that includes an RF delay line and a polarity reversal equalization section 164. The RF delay line section 162 comprises a hot electrical waveguide 166 and a ground electrical waveguide 168 that temporarily directs the electrical signal to the RF delay line section 162 that is in a non-co-linear direction relative to the direction of propagation of the optical signal.

The RF delay line section 162 has a length that causes a predetermined RF delay. The predetermined RF delay is variable over a range from zero to one hundred and eighty degrees. The polarity reversal section 164 comprises a hot electrical waveguide 166' and a ground electrical waveguide 168' that are positioned in a co-linear, but opposite direction relative to the direction of propagation of the optical signal. Polarity reversal is thus achieved by flipping the orientation of the signal relative to the optical waveguide. The compensation network and equalization section of FIG. 6 is advantageous in that the equalization section and main modulation section modulate the same optical waveguide. The disadvantage is that less electro-optic response will be available from the equalization section at high frequency due to increased velocity mismatch from counter propagation.

Figure 7:
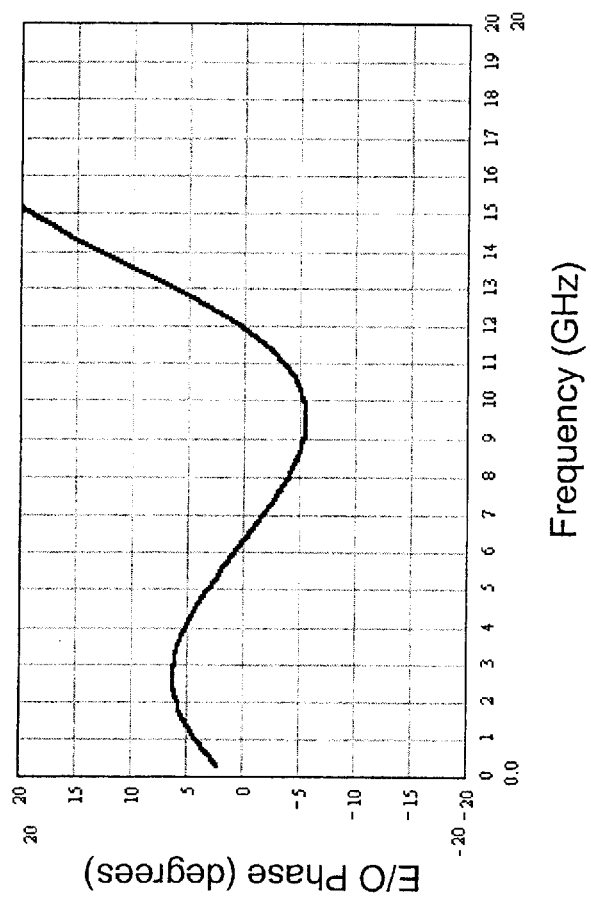
FIG. 7 illustrates a graph of calculated data for electro-optic phase as a function of frequency for the equalized Mach-Zehnder x-cut single drive electro-optic modulator of the present invention.
Figure 8:
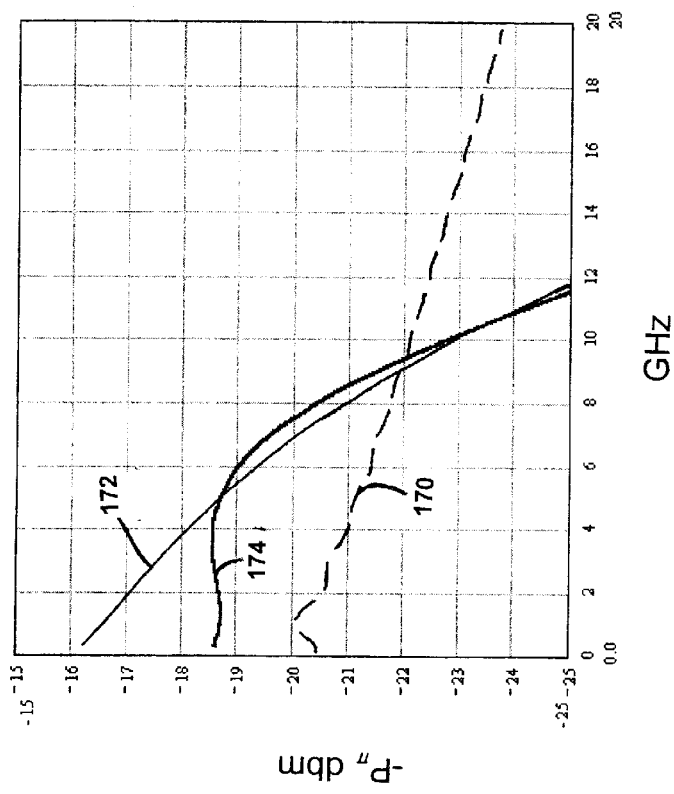
FIG. 8 illustrates a graph of calculated data for modulation efficiency as a function of frequency response comparing conventional x-cut modulators and the equalized Mach-Zehnder x-cut single drive electro-optic modulator of the present invention.

FIG. 7 illustrates a graph of calculated data for electro-optic phase as a function of frequency for the equalized Mach-Zehnder x-cut single drive electro-optic modulator 100 of the present invention using the compensation network of FIG. 5. The electro-optic phase is flat to within about +/−7 degrees up to approximately 13 GHz FIG. 8 illustrates a graph of calculated data for modulation efficiency in −Ppi in dbm as a function of frequency in GHz comparing a conventional x-cut modulator and the equalized Mach-Zehnder x-cut single drive electro-optic modulator 100 of the present invention. Three modulation efficiency frequency response curves are illustrated. The first curve 170 illustrates the modulation efficiency as a function of frequency response for a conventional 10 Gb x-cut modulator.

The second curve 172 illustrates modulation efficiency as a function of frequency response for an optimized 10 Gb x-cut modulator without using the electro-optic equalization of the present invention. The optimized modulator includes electrical waveguides positioned in a co-planar strip electrode geometry and a relatively thin buffer layer that partially velocity matches the electrical modulation signal applied to the electrical waveguide and the optical signal applied to the optical waveguide of the electro-optic modulator. The third curve 174 illustrates modulation efficiency as a function of frequency response for an optimized 10 Gb x-cut modulator using the electro-optic equalization of the present invention using the compensation network of FIG. 5.

The equalized Mach-Zehnder x-cut single drive electro-optic modulator 100 of the present invention exhibits switching voltages for a 10 Gb/s data rate that are comparable to state-of-the art conventional z-cut modulators, but with x-cut fabrication technology. For example, the switching voltage for a 50Ω driver may be less than 5V, if an impedance transformer is used between the driver and the modulator. Thus the modulator 100 provides an efficiency improvement that does not require a costly conductive buffer and charge bleed layer. In addition, the equalized Mach-Zehnder x-cut single drive electro-optic modulator 100 of the present invention more effectively extinguishes the modulation response above the required bandwidth compared with prior art x-cut devices.

The PRBS extinction after 80 km of SMF is calculated to be approximately 11 dB, which is comparable to optimized z-cut devices. This PRBS is approximately 2 dB higher than conventional x-cut devices because the chirp parameter is −0.5. Note that fiber non-linearities, receiver noise, and clock recovery were not included in these calculations.

One advantage of the equalized Mach Zehnder modulator of the present invention is that the equalization provided by the compensation networks allows designers to design electrodes that are optimized independently of bandwidth. Thus, with the equalized Mach Zehnder modulator of the present invention, the modulation efficiency and the electro-optic response can be independently controlled.

For example, one method of independently controlling the modulation efficiency and the electro-optic response includes selecting a modulator length that corresponds to a modulator bandwidth. The modulation efficiency is then adjusted at a frequency in the bandwidth of a digital spectrum by selecting an electrical waveguide geometry of the electro-optic modulator.

The waveguide geometry may be selected by choosing at least one of the buffer layer thickness, buffer layer dielectric constant, and electrical waveguide geometry to partially velocity match the electrical modulation signal applied to the electrical waveguide and the optical signal applied to the optical waveguide of the electro-optic modulator. In one embodiment, the modulation efficiency is adjusted at substantially a mean frequency of the bandwidth of the digital spectrum.

Mean frequency of the bandwidth of the digital spectrum is herein defined to be the frequency at which half the total integrated power is below the mean and half the total integrated power is above the mean. The voltage required to drive a modulator at the mean frequency of the digital spectrum provides an estimate of the switching voltage for the modulator, in response to a digital signal. The response at the mean frequency is a useful tool for designing modulators because calculation or measurement of electro-optic response at one frequency is typically easier than applying a digital signal (either in theory or experiment).

The magnitude of the electro-optic response is then reduced below the mean frequency of the digital spectrum thereby increasing an electro-optic response above the mean frequency of the digital spectrum.

In one embodiment, the magnitude of the electro-optic response in the bandwidth of the digital spectrum is modified by electrically coupling at least one compensation network to a junction of the electrical waveguide. For some applications a plurality of compensation networks are coupled to a plurality of junctions of the electrical waveguide. In one embodiment, the compensation networks time delay the electrical modulation signal and/or reverses the phase of the electrical modulation signal. The method of choosing the modulator length, adjusting the modulation efficiency, and adjusting the magnitude of the electro-optic response may by repeated or iterated to achieve a predetermined modulation efficiency and electro-optic response in the bandwidth of the digital spectrum.

Also, with the equalized Mach Zehnder modulator of the present invention, the modulation efficiency and the electro-optic response can be independently optimized. One method of independently optimizing the modulation efficiency and the electro-optic response includes selecting a modulator length that corresponds to a modulator bandwidth. The modulation efficiency is then optimized at a frequency in the bandwidth of a digital spectrum by selecting an electrical waveguide geometry of the electro-optic modulator. The modulation efficiency may be optimized at substantially a mean frequency of the digital spectrum.

The electro-optic response is optimized above the mean frequency of the digital spectrum by reducing a magnitude of an electro-optic response below the mean frequency of the digital spectrum. In one embodiment, the magnitude of the electro-optic response in the bandwidth of the digital spectrum is optimized by electrically coupling a compensation network to a junction of the electrical waveguide. The steps of selecting the modulator length, optimizing the modulation efficiency, and optimizing electro-optic response above the mean frequency of the digital spectrum may by iterated to achieve a predetermined modulation efficiency and electro-optic response in the bandwidth of the digital spectrum.

Figure 9:
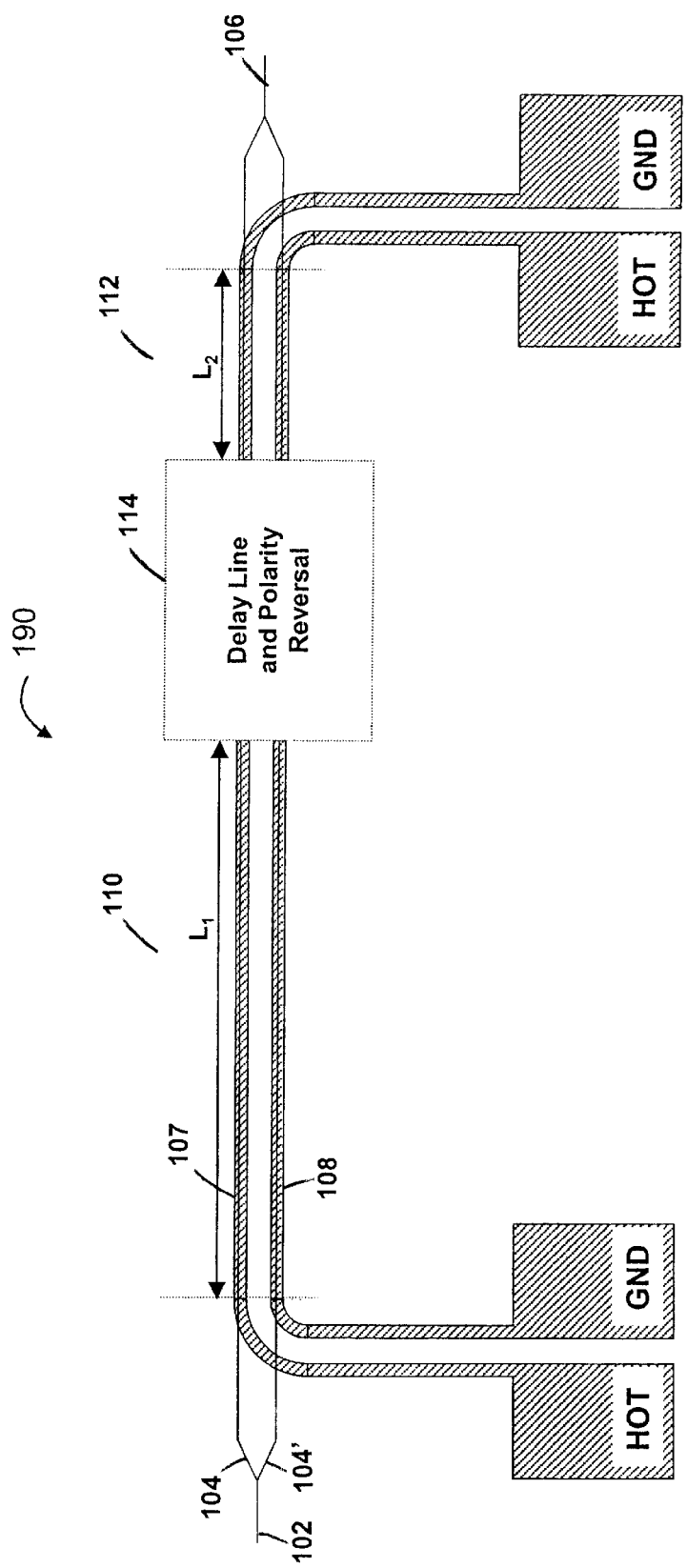
FIG. 9 illustrates a top view of an equalized Mach-Zehnder z-cut single-drive electro-optic modulator according to the present invention.

The modulator of the present invention can also be constructed from z-cut lithium niobate. FIG. 9 illustrates a top view of an equalized Mach-Zehnder z-cut single-drive electro-optic modulator 190 according to the present invention. The modulator 190 is similar to the modulator 100 of FIG. 4. The modulator 190 includes an optical input 102, a first 104 and second optical waveguide 104' positioned in a Mach-Zehnder configuration, and an optical output 106. The optical waveguides 104, 104' are formed in a z-cut lithium niobate substrate.

A hot electrical waveguide 107 and a ground electrical waveguide 108 are positioned in a co-planar strip electrode geometry that propagates the electrical modulation signal along the electrodes. Numerous other waveguide geometries can be used. In one embodiment, the electrodes provide chirped modulation, which is useful for some applications. The modulator 190 includes a main modulation section 110 and an equalization section 112.

A compensation network 114 is electrically coupled between the main modulation section 110 and the equalization section 112. The compensation network 114 may be integrated into the hot electrical waveguide 107 and the ground electrical waveguide 108 or may be a separate device that is electrically connected, but removably attached to the modulator 100. The modulator 190 is compatible with push-pull, complementary output drivers if appropriate impedance transformations are used between the driver and the modulator.

Figure 10:
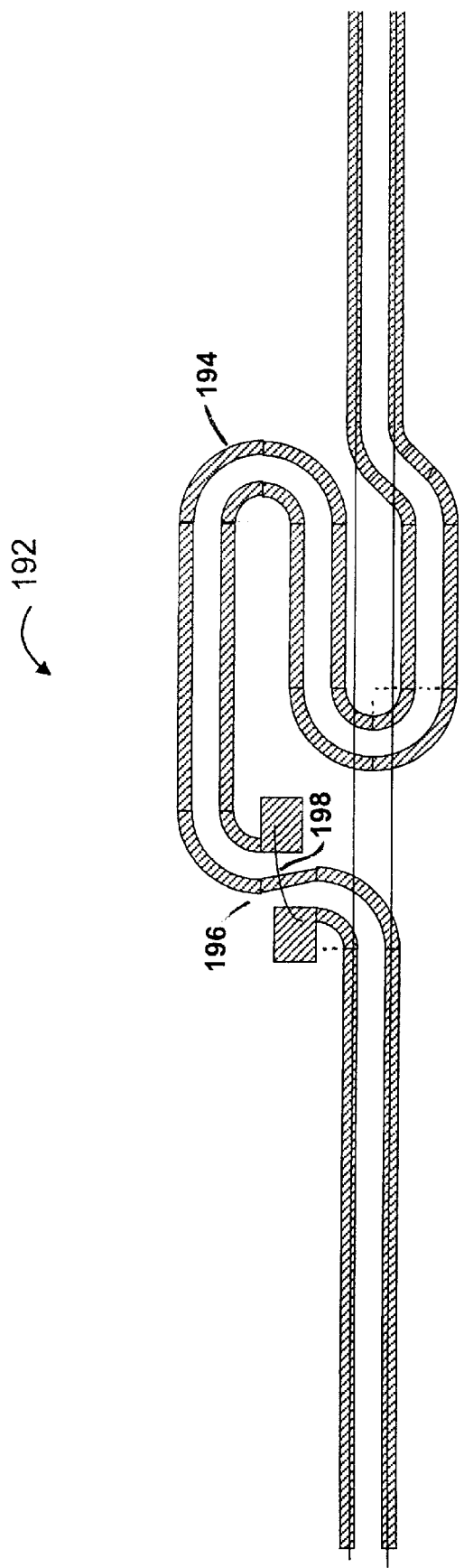
FIG. 10 illustrates a top view of one embodiment of a compensation network for a z-cut modulator according to the present invention that includes an RF delay line and a polarity reversal section.

FIG. 10 illustrates a top view of one embodiment of the compensation network 192 for a z-cut modulator according to the present invention that includes an RF delay line section 194 and a polarity reversal section 196. The compensation network 192 is similar to the compensation network 150 that was described in connection with FIG. 5, but is positioned for a z-cut modulator. In addition, the compensation network 192 includes a bridge 198 for one electrode that provides polarity reversal.

Figure 11:
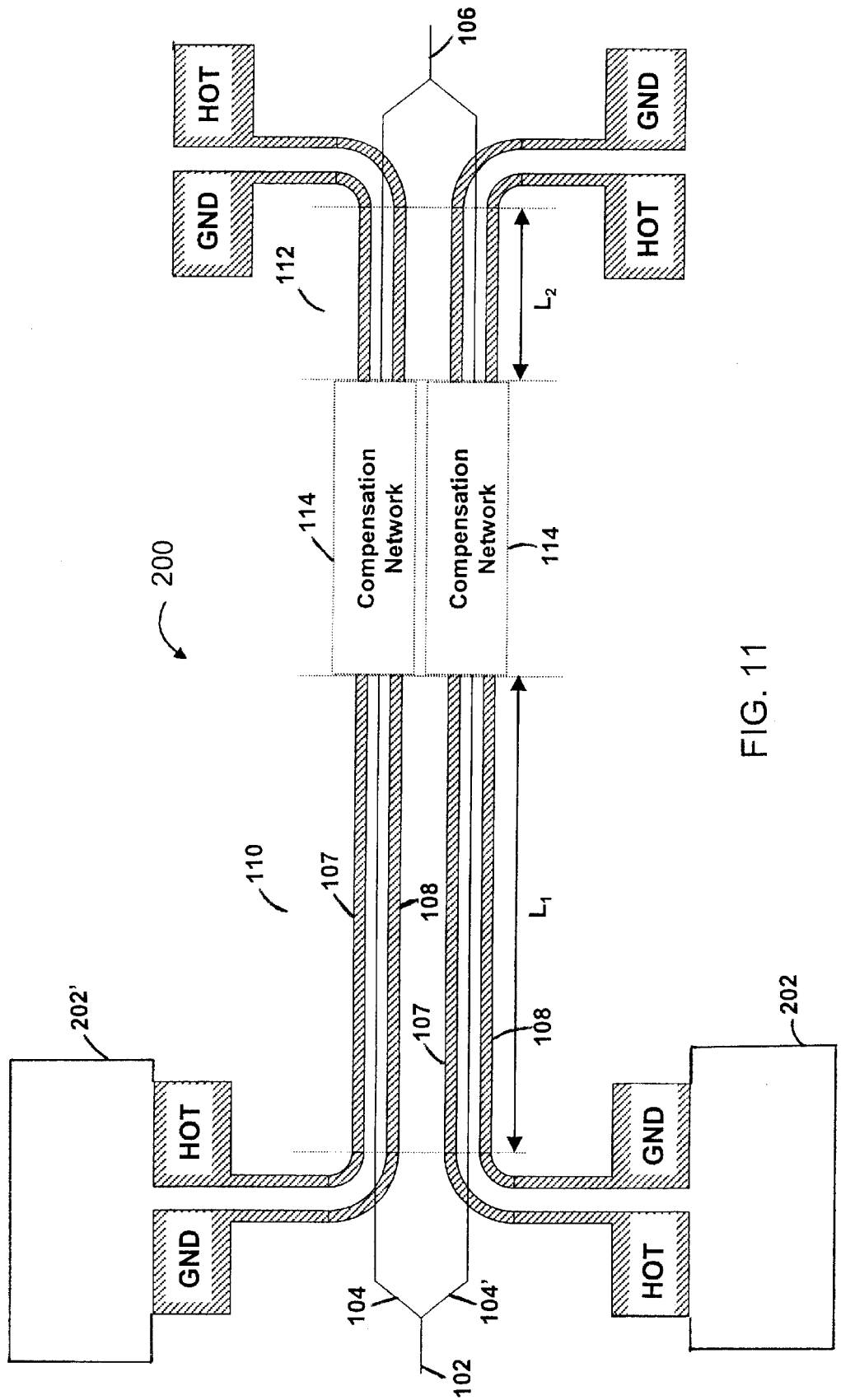
FIG. 11 illustrates a top view of an equalized Mach-Zehnder x-cut dual-drive electro-optic modulator according to the present invention.

FIG. 11 illustrates a top view of an equalized Mach-Zehnder x-cut dual-drive electro-optic modulator 200 according to the present invention. The dual-drive electro-optic modulator 200 is similar to the x-cut single-drive electro-optic modulator 100 of FIG. 4, except the modulator 200 has modulation electrodes positioned around both arms the Mach Zhender interferometer. The modulator 200 includes an optical input 102, a first 104 and second optical waveguide 104' forming two arms of a Mach-Zehnder interferometer, and an optical output 106.

A pair of hot electrical waveguides 107 and ground electrical waveguides 108 is positioned in a co-planar strip electrode geometry around each arm of the interferometer. The electrical waveguides 107, 108 propagate electrical modulation signals proximate to the optical waveguides 104, 104'. In one embodiment, the electrical waveguides 107, 108 are partially velocity matched. In this embodiment, a thin buffer layer is used to achieve partial velocity matching. In one embodiment, the electrical waveguides 107, 108 provide chirped modulation, which is useful for some applications.

The dual-drive electro-optic modulator 200 includes main modulation sections 110 and equalization sections 112. Compensation networks 114 are electrically coupled between the main modulation section 110 and the equalization section 112 of each pair of waveguides 107, 108 to equalize the electro-optic response as described in connection with FIG. 4. The compensation networks 114 may be integrated into the waveguides 107, 108 or may be separate devices that is electrically connected, but removably attached to the modulator 100.

The dual-drive electro-optic modulator 200 is advantageous because such a modulator can produce an overall efficiency that is flat over the required bandwidth and high enough for use with a flat-pack complementary driver having outputs 202 and 202'. In one embodiment, the drivers are provided by two outputs from the same driver. The drivers may include an RF launching and impedance matching structure that is attached to the electrical waveguides 107, 108. By adjusting the modulator impulse/frequency response to be complementary with the driver, the overall impulse/frequency response of the electro-optic modulator including the drivers can be made optimal.

Figure 12A:
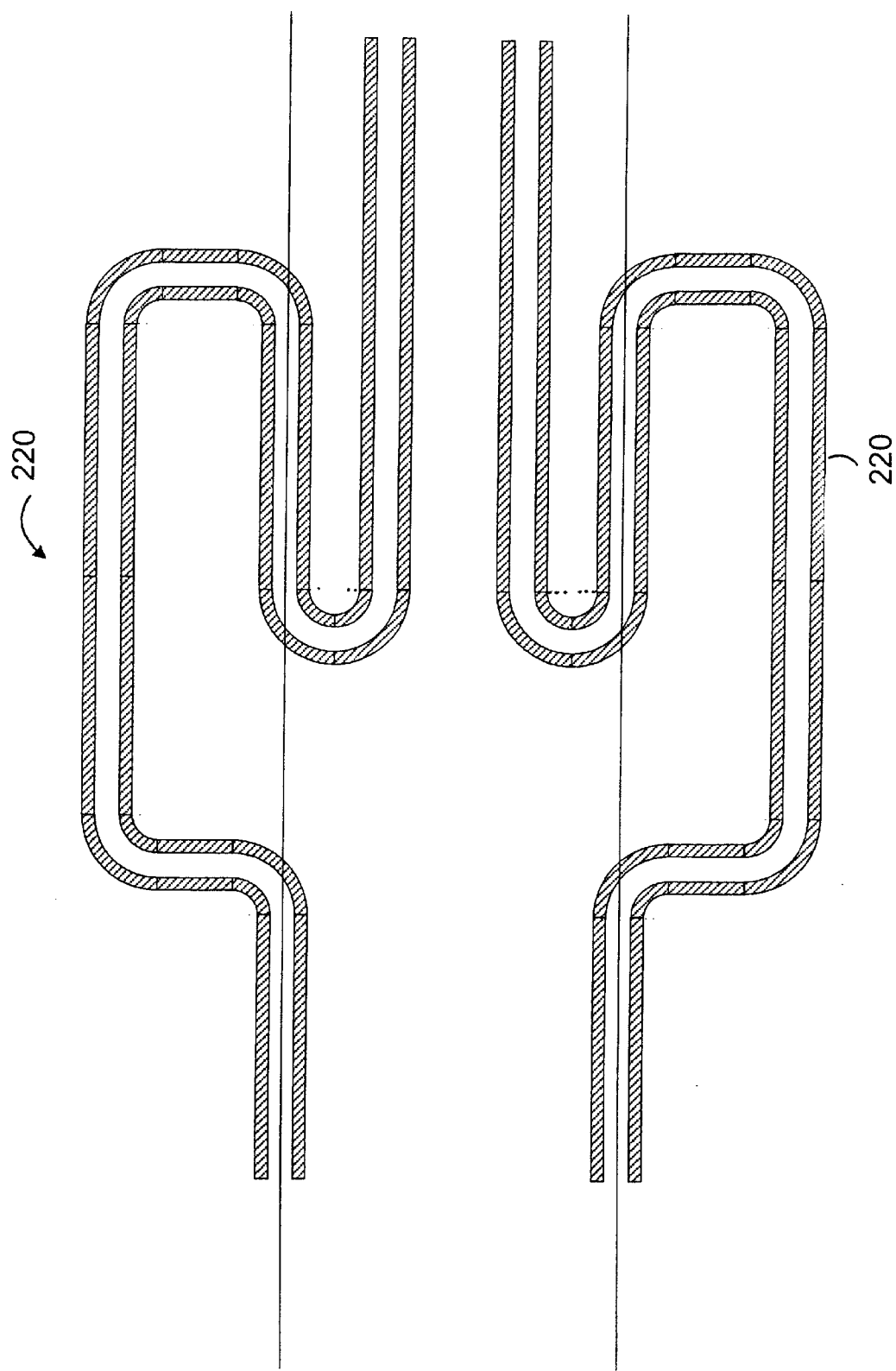
FIGS. 12a,b illustrates top views of two embodiments of compensation networks for the equalized Mach-Zehnder x-cut dual-drive electro-optic modulator of FIG. 11.
Figure 12B:
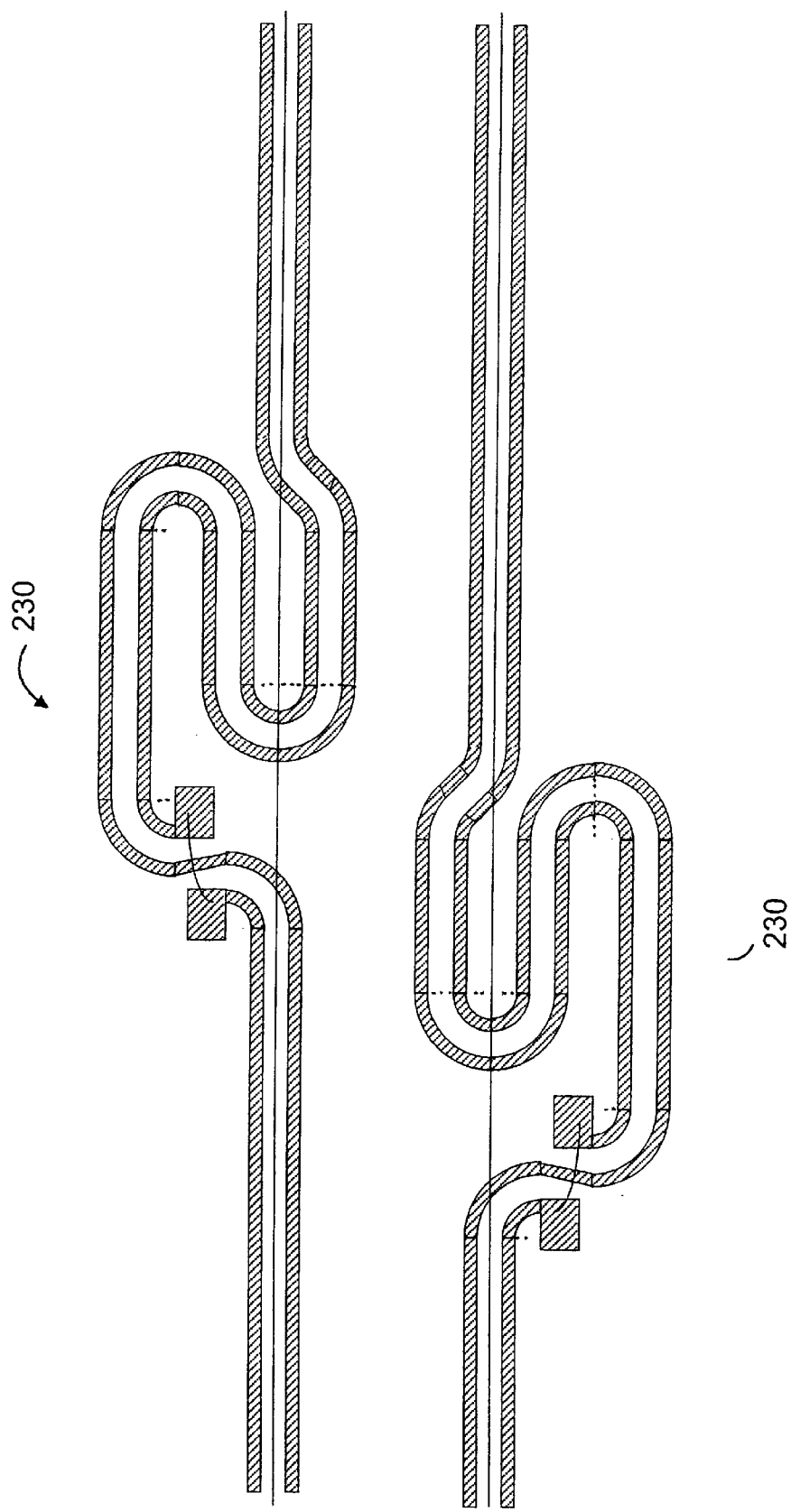

FIG. 12a illustrates a top view of one embodiment of a compensation network 220 for the equalized Mach-Zehnder x-cut dual-drive electro-optic modulator 200 of FIG. 11. The compensation networks 220 is similar to the compensation network of FIG. 6, except that each arm of the Mach-Zehnder interferometer includes a compensation network 220. FIG. 12b illustrates a top view of another embodiment of a compensation network 230 for the equalized Mach-Zehnder x-cut dual-drive electro-optic modulator 200 of FIG. 11. The compensation network 230 is similar to the compensation network of FIG. 10.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims. For example, the present invention applies to z-cut lithium niobate electro-optic modulators as well as x-cut lithium niobate electro-optic modulators.

What is claimed is:

1. A method of independently controlling modulation efficiency and electro-optic response of an electro-optic modulator for modulating digital signals, the method comprising:

a. selecting a modulator length corresponding to a modulator bandwidth;

b. adjusting the modulation efficiency at a frequency in the bandwidth of a digital spectrum by selecting an electrical waveguide geometry of the electro-optic modulator; and c. reducing a magnitude of an electro-optic response below a mean frequency of the digital spectrum thereby increasing an electro-optic response above the mean frequency of the digital spectrum.

2. The method of claim 1 further comprising repeating steps a though c to achieve a predetermined modulation efficiency and electro-optic response in the bandwidth of the digital spectrum.

3. The method of claim 1 wherein the reducing the magnitude of the electro-optic response below the mean frequency of the digital spectrum flattens an overall electro-optic response in the digital spectrum.

4. The method of claim 1 wherein the magnitude of the electro-optic response below the mean frequency of the digital spectrum is reduced by electrically coupling a compensation network to a junction of the electrical waveguide.

5. The method of claim 4 wherein the electrically coupling the compensation network to the junction of the electrical waveguide comprises electrically coupling a plurality of compensation networks to the electrical waveguide at a plurality of junctions.

6. The method of claim 1 wherein the modulation efficiency is adjusted at substantially a mean frequency of the bandwidth of the digital spectrum.

7. The method of claim 1 wherein adjusting the modulation efficiency at the frequency in the bandwidth of the digital spectrum comprises substantially maximizing the modulation efficiency of the electro-optic modulator at the frequency in the bandwidth of a digital spectrum.

8. The method of claim 1 further comprising selecting at least one of the buffer layer thickness, buffer layer dielectric constant, and electrical waveguide geometry to partially velocity match an electrical modulation signal applied to the electrical waveguide and an optical signal applied to an optical waveguide of the electro-optic modulator.

9. The method of claim 1 further comprising selecting an electrical waveguide geometry that provides chirp modulation.

10. The method of claim 1 wherein the reducing the magnitude of the electro-optic response below the mean frequency of the digital spectrum comprises reversing a polarity of an electrical modulation signal.

11. The method of claim 1 further comprising time delaying an electrical modulation signal applied to the electrical waveguide.

12. A method of independently optimizing modulation efficiency and electro-optic response of an electro-optic modulator for modulating digital signals, the method comprising:
   a. selecting a modulator length corresponding to a modulator bandwidth;
   b. optimizing the modulation efficiency at a frequency in the bandwidth of a digital spectrum by selecting an electrical waveguide geometry of the electro-optic modulator; and
   c. optimizing an electro-optic response above the mean frequency of the digits spectrum by reducing a magnitude of an electro-optic response below a mean frequency of the digital spectrum.

13. The method of claim 12 wherein the modulation efficiency is optimized at or above the mean frequency of the digital spectrum.

14. The method of claim 12 wherein the electro-optic response above the mean frequency of the digital spectrum is optimized by electrically coupling a compensation network to a junction of the electrical waveguide.

15. An electro-optic modulator for modulating digital signals, the electro-optic modulator comprising:
   a. an optical waveguide formed in an electro-optic material, the optical waveguide propagating an optical signal along a first direction of propagation;
   b. an electrical waveguide formed on the electro-optic material and positioned generally co-linear relative to the optical waveguide and in electromagnetic communication with the optical waveguide, the electrical waveguide propagating an electrical modulation signal in the first direction of propagation, wherein the geometry of the electrical waveguide is selected to achieve a modulation efficiency at a frequency in a bandwidth of a digital spectrum; and
   c. a compensation network electrically coupled to the electrical waveguide at a junction, the compensation network modifying an electro-optic response of the electro-optic modulator below a mean frequency of the digital spectrum, thereby causing a magnitude of the electro-optic response to increase above the mean frequency of the digital spectrum.

16. The electro-optic modulator of claim 15 wherein the electrical waveguide comprises a co-planner strip electrode.

17. The electro-optic modulator of claim 15 further comprising a driver coupled to the electrical waveguide that has a frequency response that is complementary to an electro-optic frequency response of the modulator.

18. The electro-optic modulator of claim 15 wherein the electro-optic modulator comprises a Mach Zehnder interferometric modulator.

19. The electro-optic modulator of claim 15 wherein the electrical waveguide comprises a pair of hot and ground electrical waveguides positioned proximate to each arm of the Mach Zehnder interferometric modulator.

20. The electro-optic modulator of claim 19 wherein the electrical waveguides comprise dual-drive electrical waveguides, the dual drive electrical waveguides comprising a first and second pair of hot and ground electrical waveguides positioned proximate to a first and second arm of the Mach Zehnder interferometric modulator, respectively.

21. The electro-optic modulator of claim 20 further comprising a driver that is coupled to each pair of hot and ground electrical waveguides.

22. The electro-optic modulator of claim 15 wherein the electrical waveguide geometry is selected to achieve the modulation efficiency at substantially a mean frequency in the bandwidth the digital spectrum.

23. The electro-optic modulator of claim 15 further comprising a buffer layer formed on the optical waveguide.

24. The electro-optic device of claim 23 wherein the buffer layer formed on the optical waveguide partially velocity matches the electrical modulation signal to an optical signal.

25. The electro-optic modulator of claim 23 wherein the at least one of the buffer layer thickness, buffer layer dielectric constant, and electrode geometry are selected to maximize modulation efficiency at the frequency in the bandwidth of the digital spectrum.

26. The electro-optic modulator of claim 15 wherein the compensation network modifies at least one of a phase or an amplitude of an electrical modulation signal at the junction relative to a phase or an amplitude of an accumulated modulation on an optical signal at the junction, respectively.

27. The electro-optic modulator of claim 15 wherein the compensation network propagates the electrical signal in a second direction of propagation that is substantially non-colinear with the first direction of propagation.

28. The electro-optic modulator of claim 15 wherein the compensation network comprises an RF time delay network.

29. The electro-optic modulator of claim 15 wherein the compensation network comprises a polarity reversal section.

30. The electro-optic modulator of claim 15 wherein the polarity reversal section comprises two substantially similar electrodes that generate fringing fields that modulate the optical signal in a waveguide exterior to an electrode gap.

31. The electro-optic modulator of claim 15 wherein the compensation network comprises a plurality of compensation networks, a respective one of the plurality of compensation networks being electrically coupled to the electrical waveguide at a respective one of a plurality of junctions.

32. The electro-optic modulator of claim 15 wherein the electrical waveguide provides chirp modulation.

33. The electro-optic modulator of claim 15 wherein an electrical loss per unit length of the compensation network is lower than an electrical loss per unit length of the electrical waveguide.

34. The electro-optic modulator of claim 15 wherein the compensation network is removably attached to the electro-optic modulator.

35. The electro-optic modulator of claim 15 wherein a temperature dependence of the compensation network is inversely proportional to a temperature dependence of the electro-optic material.

36. A method of independently controlling modulation efficiency and electro-optic response of an electro-optic modulator for modulating digital signals, the method comprising:
   a. selecting a modulator length corresponding to a modulator bandwidth;

b. adjusting the modulation efficiency at a frequency in the bandwidth of a digital spectrum by selecting an electrical waveguide geometry of the electro-optic modulator; and c. electro-optically reducing a magnitude of an electro-optic response below a mean frequency of the digital spectrum.

37. The method of claim 36 wherein the electro-optic response above the mean frequency of the digital spectrum is increased.

38. A method of independently controlling modulation efficiency and electro-optic response of an electro-optic modulator for modulating digital signals, the method comprising:

a. selecting a modulator length corresponding to a modulator bandwidth;

b. adjusting the modulation efficiency at a frequency in the bandwidth of a digital spectrum by selecting an electrical waveguide geometry of the electro-optic modulator; and c. time delaying an electrical modulation signal applied to the electrical waveguide, thereby increasing an electro-optic response above the mean frequency of the digital spectrum.

* * * * *